United States Patent
Lin et al.

(10) Patent No.: US 8,462,198 B2
(45) Date of Patent: Jun. 11, 2013

(54) ANIMATION GENERATION SYSTEMS AND METHODS

(75) Inventors: Tzung-Han Lin, Erlun Township (TW); Chih-Jen Teng, Yongkang (TW); Fu-Jen Hsiao, Hsinchu (TW)

(73) Assignee: Industrial Technology Research Institute, Chutung (TW)

( * ) Notice: Subject to any disclaimer, the term of this patent is extended or adjusted under 35 U.S.C. 154(b) by 289 days.

(21) Appl. No.: 12/941,098

(22) Filed: Nov. 8, 2010

(65) Prior Publication Data

US 2011/0157306 A1    Jun. 30, 2011

Related U.S. Application Data

(60) Provisional application No. 61/290,848, filed on Dec. 29, 2009.

(51) Int. Cl.
*H04N 13/00* (2006.01)
*G06T 13/00* (2006.01)

(52) U.S. Cl.
USPC ............................................ 348/43; 345/473

(58) Field of Classification Search
USPC ..................... 348/43; 345/419, 474
See application file for complete search history.

(56) References Cited

U.S. PATENT DOCUMENTS

| | | | |
|---|---|---|---|
| 5,745,126 A * | 4/1998 | Jain et al. .................. 382/154 |
| 5,889,532 A | 3/1999 | Boucher et al. | |
| 6,057,859 A | 5/2000 | Handelman et al. | |
| 6,088,042 A | 7/2000 | Handelman et al. | |
| 6,191,798 B1 | 2/2001 | Handelman et al. | |
| 6,522,332 B1 | 2/2003 | Lanciault et al. | |
| 6,670,954 B2 | 12/2003 | Arai et al. | |
| 7,035,436 B2 | 4/2006 | Nakamura et al. | |
| 7,106,334 B2 | 9/2006 | Imagawa et al. | |
| 7,202,869 B2 | 4/2007 | Tooley et al. | |
| 8,253,746 B2 * | 8/2012 | Geisner et al. .................. 345/474 |
| 2004/0104935 A1 * | 6/2004 | Williamson et al. .......... 345/757 |
| 2011/0148858 A1 * | 6/2011 | Ni et al. ........................ 345/419 |

OTHER PUBLICATIONS

Baran Ilya and Popovic, Jovan; "Automatic Rigging and Animation of 3D Characters"; ACM SIGGRAPH conference proceedings.
De Aguiar, Edilson et al.; "M3: Marker-Free Model Reconstruction and Motion Tracking from 3D Voxel Data".
Shi, Xiaohan; "Mesh Puppetry: Cascading Optimization of Mesh Deformation with Inverse Kinematics".

* cited by examiner

*Primary Examiner* — David Czekaj
*Assistant Examiner* — Tsion B Owens
(74) *Attorney, Agent, or Firm* — Wang Law Firm, Inc.; Li K. Wang; Stephen Hsu (57) ABSTRACT

The animation generation system includes: an avatar generation module for generating an avatar in a virtual space, wherein the avatar has a set of skeletons and a skin, and the movable nodes of the set of skeletons are manipulated so that a motion of the skin is induced; and an avatar manipulation module for manipulating the movable nodes, including: a position mark which is moved to at least one first real position in a real space; at least one control mark which is moved to at least one second real position in the real space; and a video capturing unit for capturing the images of the real space; an arithmetic unit for identifying the first real position and the second real position from the images of the real space, and converting the first real position into a first virtual position, and the second real position into a second virtual position.

19 Claims, 10 Drawing Sheets

ANIMATION GENERATION SYSTEMS AND METHODS

CROSS REFERENCE TO RELATED APPLICATIONS

This Non-provisional application claims priority under 35 U.S.C. §119(a) on Provisional Patent Application Nos. 61/290,848, filed in United States of America on Dec. 29, 2009, the entire contents of which are hereby incorporated by reference.

BACKGROUND

1. Technical Field

The present disclosure relates to animation generation systems and methods, and in particular relates to animation generation systems and methods for manipulating avatars in an animation.

2. Description of the Related Art

Due to increasing popularity of the internet, some network applications and online multiplayer games have grown in membership and usage. Thus, global revenues for digital content providers providing the network applications and online games have reached around US$35 billion per year.

An avatar represents a computer user on the Internet, in the form of a one-dimensional (1D) username or a two-dimensional (2D) icon (picture). Nowadays, the avatar is usually in a form of a three-dimensional model commonly used in computer games. Conventionally, procedures to construct a 3D avatar comprise steps of producing a 2D image, constructing its 3D mesh details, building its skeleton, etc. All the steps need a lot of time and effort, so that it is hard for a normal user to construct a personalized 3D virtual avatar.

Accordingly, an integrated system or method, wherein a personalized avatar can be easily generated and manipulated, would fulfill enjoyment for users' for network

BRIEF SUMMARY

The purpose of the present disclosure is to provide systems and method for generating a 3D avatar rapidly and efficiently and manipulating the 3D avatar.

The present disclosure provides an animation generation system. The animation generation system comprises an avatar generation module for generating an avatar in a virtual space, wherein the avatar has a set of skeletons and a skin attached to the set of skeletons, and the set of skeletons has a plurality of movable nodes, and the movable nodes are manipulated so that a motion of the skin is induced; and an avatar manipulation module for manipulating the movable nodes of the avatar, comprising a position mark which is moved by users to at least one first real position in a real space; at least one control mark which is moved by the users to at least one second real position in the real space; a video capturing unit for capturing the images of the real space; an arithmetic unit, coupled to the video capturing unit, for identifying the first real position and the second real position from the images of the real space, and converting the first real position into a first virtual position where the avatar is in the virtual space, and the second real position into a second virtual position where one of the movable nodes of the avatar is in the virtual space, wherein the relative motions between the virtual control position and the first virtual position make the avatar perform a series of successive motions in the virtual space, and one of the images captured by the video capturing unit are drawn as a background, while one of the images of a designated object corresponding to the position mark is drawn onto the background, according to the first virtual position, to generate an Augmented Reality (AR) animation.

The present disclosure provides an animation generation method for generating an avatar in a virtual space. The avatar has a set of skeletons and a skin attached to the set of skeletons, and the set of skeletons has a plurality of movable nodes, and the movable nodes are manipulated so that a motion of the skin is induced. The animation generation method comprises: moving a position mark to at least one first real position in a real space; moving at least one control mark to at least one second real position in the real space; capturing the images of the real space; identifying the first real position and the second real position from the images of the real space; converting the first real position into a first virtual position where the avatar is in the virtual space; and converting the second real position into a second virtual position where one of the movable nodes of the avatar is in the virtual space, wherein the relative motions between the virtual control position and the virtual position position make the avatar perform a series of successive motions in the virtual space, drawing one of the images of the real space as a background, and drawing a designated object on the first virtual position onto the background to generate an Augmented Reality (AR) animation.

The present disclosure provides a multi-view animation generation system. The multi-view animation generation system comprises at least one mark which is moved by users to at least one first real position in a real space; an arithmetic unit, coupled to at least two video capturing units, wherein the at least two video capturing units for capturing image streams of the real space and transmitting the image stream to the arithmetic unit; and the arithmetic unit identifying at least two first real positions from the images of the real space, and converting the at least two real positions into at least two virtual positions in virtual space; a multi-view animation synthesizing unit, coupled to the arithmetic unit, for drawing one of the images captured by the video capturing unit as a background; drawing a virtual model corresponding to the mark on one of the at least two virtual positions onto the background; synthesizing the background and the virtual model by using known 3D technique to generate an animation; and transmitting the animation to the multi-view display unit.

The present disclosure provides a multi-view video generation method for synthesizing a multi-view video and drawing a virtual model in the multi-view video. The multi-view video generation method comprises: placing a mark on at least one real position in a real space; capturing the images of the real space by using at least two video capturing units; identifying at least two real positions from the images of the real space; converting the at least two real positions into at least two virtual positions in a virtual space; and synthesizing a multi-view video, comprising: drawing one of the images captured by the video capturing unit as a background; drawing a virtual model corresponding to the mark on one of the at least two virtual positions onto the background to form a result video; synthesizing the background and the virtual model by using known multi-view synthesizing methods to generate a multi-view video.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

Figure 1:
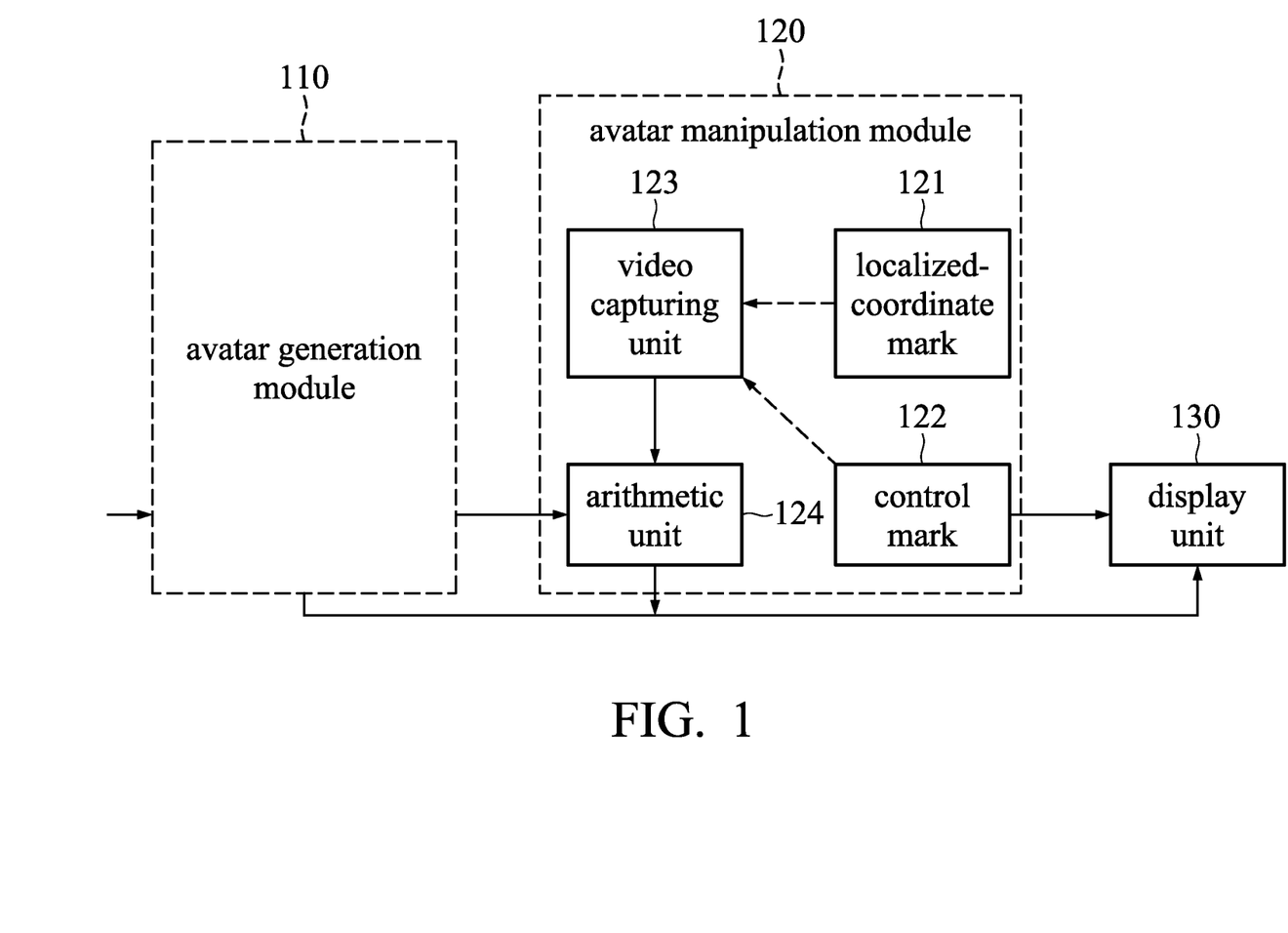
FIG. 1 shows an animation generation system according to the present disclosure.

FIG. 1 shows an animation generation system according to the present disclosure. The animation generation system comprises an avatar generation module 110, an avatar manipulation module 120, and a display unit 130. The avatar generation module 110 is used to generate an avatar in a virtual space, where the avatar has a set of skeletons and a skin attached to the set of skeletons. The virtual space and the avatar may be displayed in the display unit 130. For the purpose of illustrating the present disclosure, the avatar in the following description is a human, which has a human-like figure comprising a head, a body and four limbs. The set of skeletons of the avatar has a plurality of movable nodes, and the movable nodes may be manipulated so that a motion of the skin is induced. For example, a point on a femur (thigh bone) may be moved relative to the tibia (shinbone), while a point on the skin attached to the femur may be still relative to the entire femur. The avatar manipulation module 120 is used to manipulate the movable nodes of the avatar, so that the avatar can perform various movements in the virtual space, to generate an animation. The function and structure of the avatar generation module 110, the avatar manipulation module 120 and the display unit 130 will be illustrated in the following paragraphs.

Figure 2:
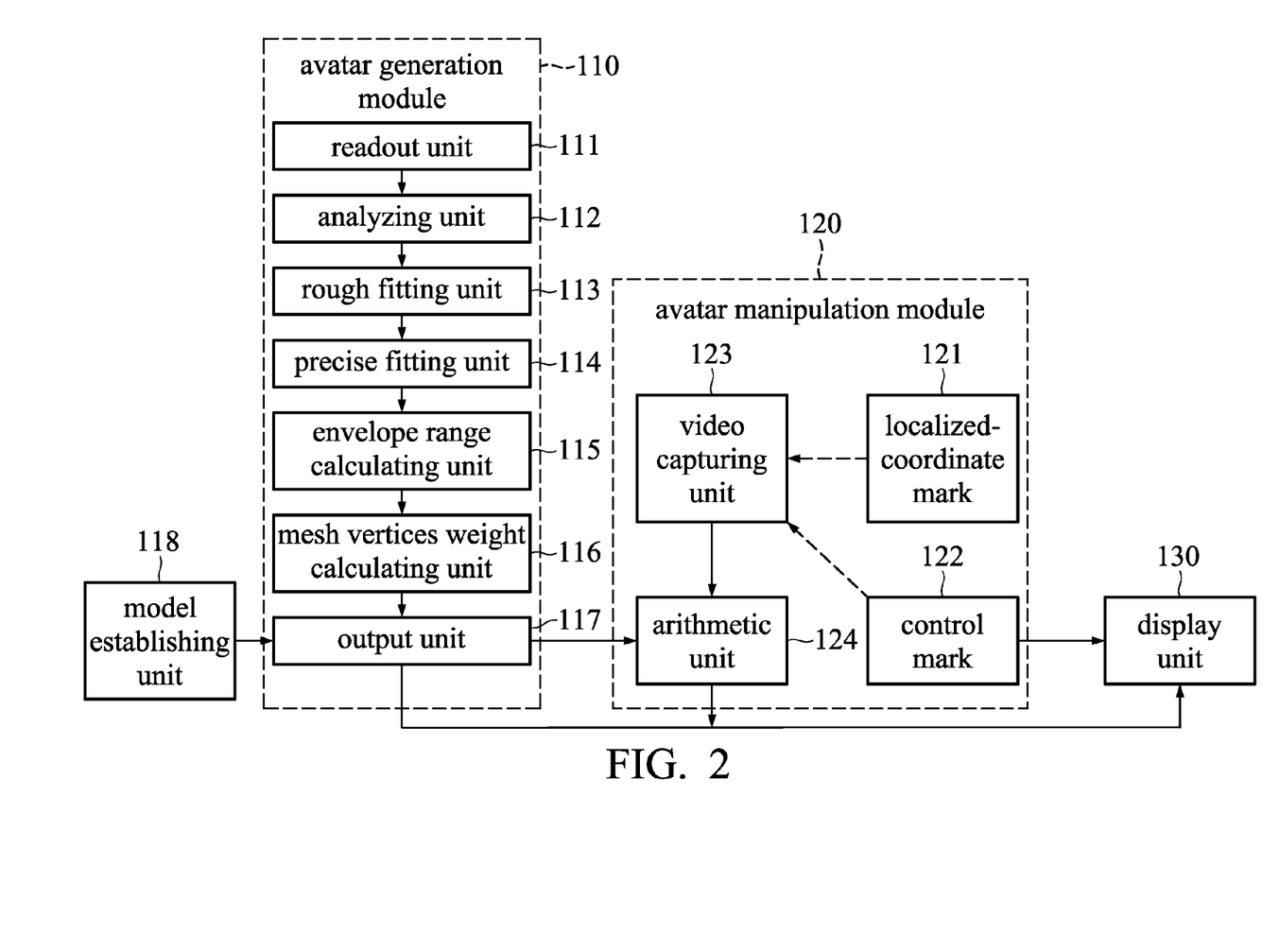
FIG. 2 shows a detailed animation generation system of the present disclosure.
Figure 4:
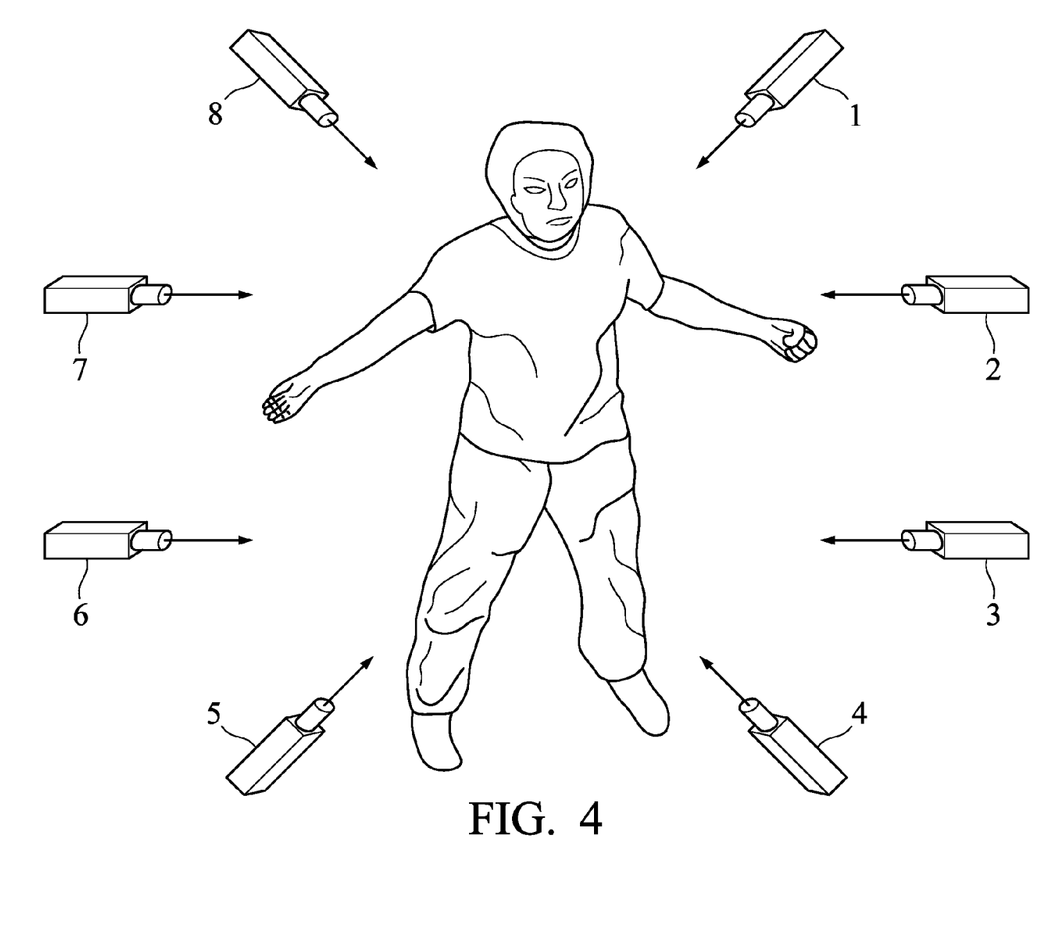
FIG. 4 shows an example which uses the model establishing unit 118 to establish the skin information of the avatar skin.

FIG. 2 shows a detailed animation generation system of the present disclosure. As shown in FIG. 2, the avatar generation module 110 of the present disclosure comprises a readout unit 111, an analyzing unit 112, a rough fitting unit 113, a precise fitting unit 114, an envelope range calculating unit 115, a mesh vertices weight calculating unit 116 and an output unit 117. The readout unit is used to read out skin information in respect of the skin, and skeleton information in respect of a set of template skeletons. The skin information is composed of data of a plurality of triangles or mesh vertices. For example, the skin of the avatar may be composed of about 20 thousands triangle meshes, where each of the meshes further comprises color and material information. The skeleton information comprises identification data (such as the name and the serial number) of, geometric data (such as the shape and the size) of, and linkage relationship between, each bone of the set of template skeletons. In an embodiment, the readout unit 111 may be coupled to a model database (not shown), where the skin information and the skeleton information stored therein may be read out by the readout unit 111. In another embodiment, the readout unit 111 may be further coupled to a model establishing unit 118. FIG. 4 shows an example which uses the model establishing unit 118 to establish the skin information of the avatar skin. The model establishing unit 118 shoots a real model (for example, a real human) by using several camcorders synchronously (for example, camcorder 1~8) to obtain image information from the model, establishes a three dimension (3D) virtual model corresponding to the real human (having skin information but no skeleton information) by using a visual hull algorithm, and then provides the virtual model to the readout unit. For the convenience of subsequent processes, the model shot by the camcorders may be asked to face a designated direction with a designated posture. For example, the model may be asked to face ahead and stretch like an eagle with both hands and feet protrude sideways and outwards, respectively, as shown in FIG. 4. With the model establishing unit 118, the customized avatars can be easily drawn into any animation.

Figure 5:
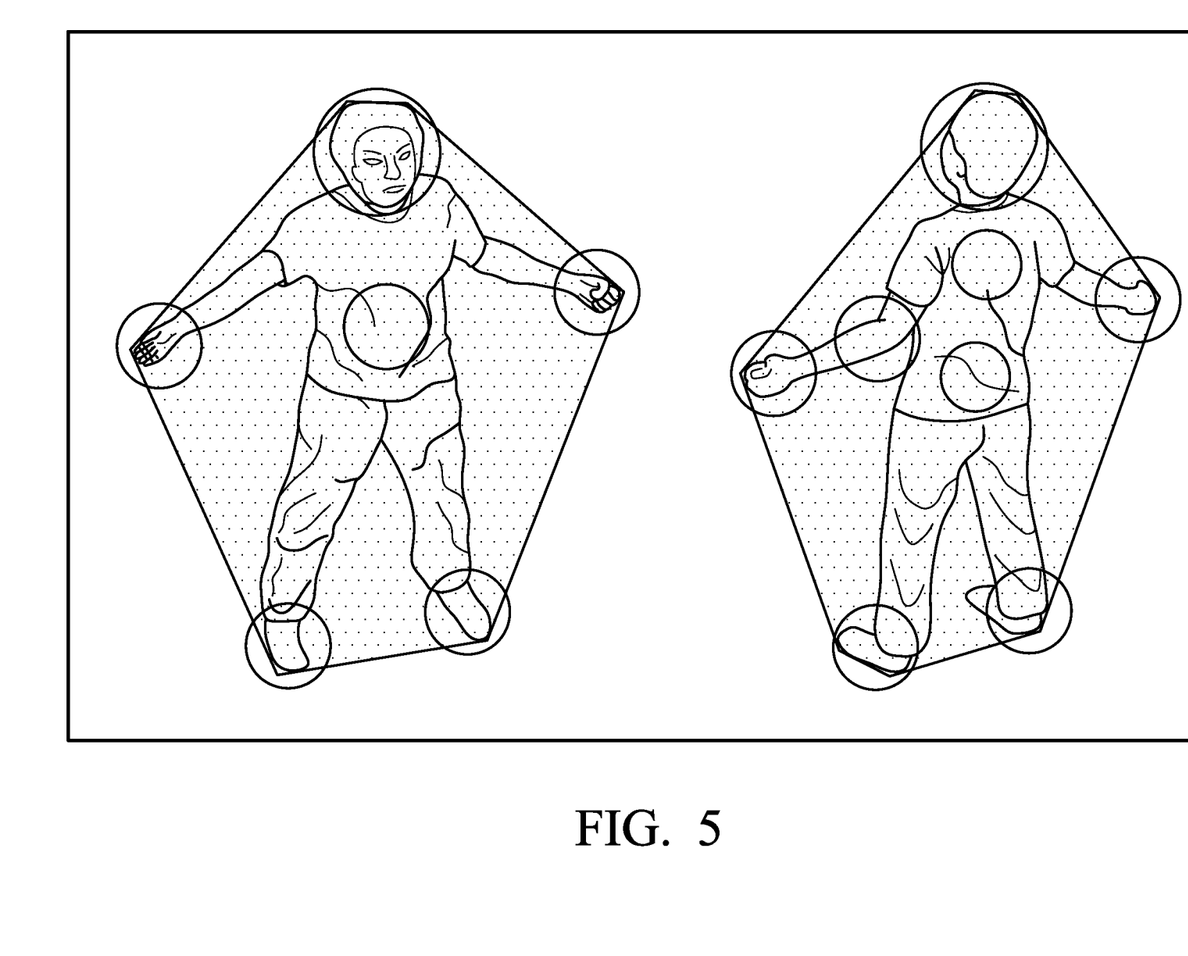
FIG. 5 shows the appearance features of the avatar.

The analyzing unit 112 of the present disclosure is used to analyze the skin information to obtain a plurality of appearance features and a plurality of trunk feature. Specifically, the appearance features are the protruding points on the skin. FIG. 5 shows the appearance features. The analyzing unit 112 of the present disclosure first analyzes the skin information of the avatar to find the convex hull of skin, which is the polyhedron covering the avatar, as shown in FIG. 5. In FIG. 5, the appearance features are the most protruding points on the convex hull (marked with circles), i.e., the end-points of the polyhedron (if the skin information of the avatar is obtained by using 3D image technique, the protruding points on the back or the stomach of the avatar may be found as the appearance features). In an embodiment, when the model stretches like an eagle, as described above, the appearance features representative of the head, the hands and the legs of the avatar of the model can be easily found out by the analyzing unit 112. However, physically, the analyzing unit 112 may find far more appearance features than expected. In such a case, according to the distances between the appearance features, the analyzing unit 112 may remove unreasonable appearance features one by one, and then control the number of appearance features to be between 5-10. After determining the appearance features, the analyzing unit 112 may further find the trunk features of the avatar. The trunk features is found to form a central axis within the skin of the avatar.

The rough fitting unit 113 of the present disclosure is used to adjust the size of the template skeletons according to the appearance features to generate the skeletons of the avatar, and fit the template skeletons to the appearance features. In an embodiment, the present disclosure can adjust the size of the template skeletons automatically by wising Inverse Kinematics. However, in another embodiment, the size of the template skeletons may be adjusted by users manually. Although the template skeletons are not directly obtained from the model shot by the camcorder, since the shape of the skeletons of the human body are similar to each other, after adjusting the scale and the size of the template skeletons by the rough fitting unit 113, the personalized skeletons belonging to the model may be constructed. After adjusting the size of the skeletons, the personalized set of skeletons is fitted to the appearance features of the avatar skin. Specifically, this fitting procedure further comprises a rotating procedure and a locating procedure. The rotating procedure firstly rotates the skin of the avatar toward the +Z axis in the virtual space, and then rotates the top end of the appearance features toward the +Y axis in virtual space. The locating procedure respectively locates each end of the set of skeletons to a specific coordinate. For example, the locating procedure may: (1) locate the top end of the head to the coordinate which has the highest Y value: (2) locate the end of the left hand to the coordinate which has the highest X value; (3) locate the end of the right hand to the coordinate which has the lowest X value; (4) locate the end of the left foot to the coordinate which has a negative Y value and the highest X value; (5) locate the end of the right foot to the coordinate which has a negative Y value and the lowest X value.

The precise fitting unit 114 of the present disclosure is used to fit the set of skeletons to the trunk features of the skin. Although the rough fitting unit 113 fits specific ends of the skeletons of the avatar to skin, there may be some skeletons which are located out of the skin. Therefore, the precise fitting unit 114 has to fit the set of skeletons to skin more precisely. The precise fitting unit 114 fits the bone which was located at a wrong place to a correct place according to the trunk features of the closest bone by using Inverse Kinematics. The precise fitting unit 114 may repeat the foregoing procedures till all the skeletons of the avatar have been correctly fitted.

Figure 6A:
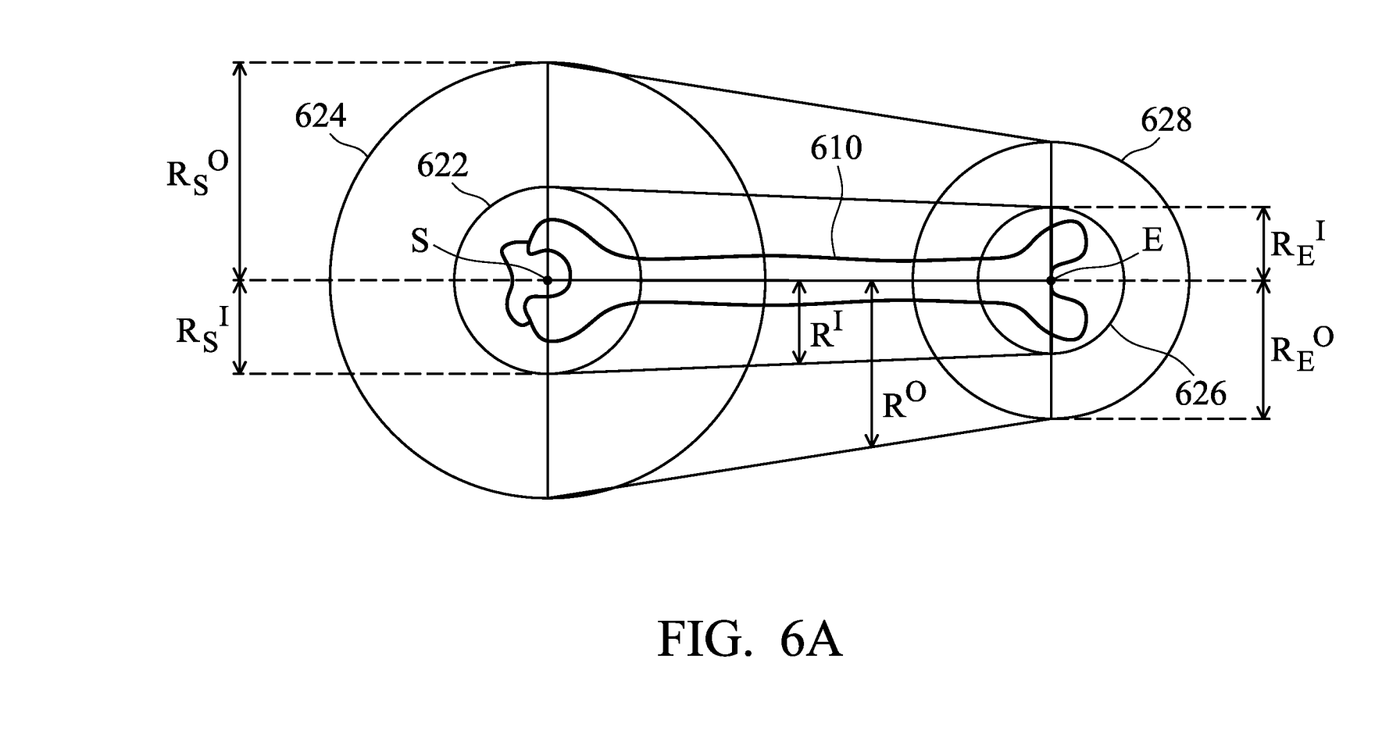
FIGS. 6A and 6B shows the profile of a bone and its envelope range according to an embodiment of the present disclosure.
Figure 6B:
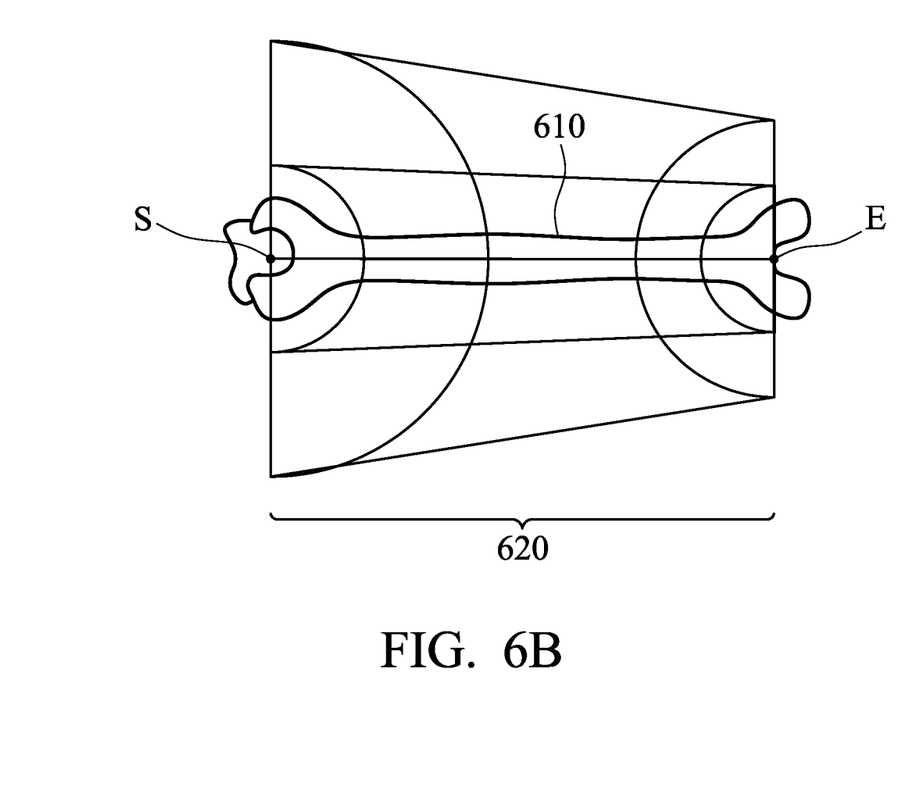

The envelope range calculating unit 115 of the present disclosure is used to calculate an envelope range of each bone of the set of skeletons according to a plurality of mesh vertices in proximity to the bone. FIGS. 6A and 6B show the profile of a bone and its envelope range according to an embodiment of the present disclosure. A bone 610 has a starting point S and an end point E. In this embodiment, the envelope range 620 respectively forms two concentric hemispheres (called "sphere" hereinafter for brief description) on the starting point S and the end point E, as shown in FIG. 6A. Taking the two concentric spheres on the starting point S for example, the two concentric spheres may both have the starting point S as their centers, the distance between the point S and the furthest mesh vertex in a searching range (the searching range is a sphere having the point S as its center and at most half of the total length of the avatar as its radius) away from the point S (i.e., the normal of the mash vertex is outward from the bone) as the radius $R_S^I$ of the inner concentric sphere 622, and the distance between the point S and the nearest mesh vertex in the search range toward the point S as the radius $R_S^O$ of the outer sphere 624. Similarly, the two concentric spheres on the end point E may both have the end point E as their centers, the distance between the point E and the furthest mesh vertex in a searching range (the searching range is a sphere having the point E as its center and at most half of the total length of the avatar as its radius) away from the point E as the radius $R_E^O$ of the inner concentric sphere 626, and the distance between the point E and the nearest mesh vertex in the search range toward the point S as the radius $R_E^O$ of the outer sphere 628. Further, the envelope range 620 and the concentric spheres 622~628 have to satisfy the following conditions: (1) the radiuses of the inner sphere and the outer sphere are not greater than the length of the set of skeletons 610; (2) the radiuses of the inner sphere and the outer sphere are not smaller than the internal radius of the bone 610; (3) the radius of the inner sphere is not greater than that of the outer sphere; (4) the radius of the outer sphere is not smaller than that of the inner sphere: (5) two adjacent envelope ranges do not overlap each other if possible; and (6) The envelope range of two symmetrical limbs (for example, the right femur and the left femur) do not overlap each other. After forming the concentric sphere 622~628, the envelope range calculating unit 115 may calculate the inner $R_I$ and outer radius $R_O$ of the envelope range between the points S and E according to the concentric sphere 622~628 by using interpolation. The inner envelope, the outer envelope, and the space between them due to inter-polation may form a two-layered space. Finally, the envelope range calculating unit 115 may further remove half of the concentric sphere 622~628 which exceeds the length of the bone and generate a two-layer-barrel-shaped envelope range, as shown in FIG. 6B.

The mesh vertices weight calculating unit 116 of the present disclosure is used to calculate the weight of a mesh vertex of the skin information relative to a bone according the envelope range, where the weight of the mesh vertex indicates how the mesh vertex is affected by the movement of the bone when the bone is moving. The mesh vertices weight calculating unit 116 calculates the weight of the mesh vertices in accordance with the flowing rules: rule (1): when a mesh vertex is inside the inner layer of the envelope of a bone, the weight of the mesh vertex in relation to the bone is 1.0, which indicates that the mesh vertex is totally affected by the movement of the bone when the bone is moving; rule (2): when a mesh vertex is outside of the outer layer of the envelope of a bone, the weight of the mesh vertex in relation to the bone is 0.0, which indicates that the mesh vertex is totally unaffected by the movement of the bone when the bone is moving; rule (3) when a mesh vertex is between the inner and outer layer of the envelope range of a bone, the weight of the mesh vertex in relation to the bone decreases as follows: $\text{Weight}^{vi}_{bi}(\text{dist}_{bi})$ =$\text{Decay}(\text{dist}_{bi})$, where $\text{Weight}^{vi}_{bi}$ is the weight of a mesh vertex vi in relation to the bone bi; $\text{dist}_{bi}$ is the distance between the mesh vertex vi and the bone bi; and Decay(x) is a decreasing function, decreasing from 1 to 0; rule (4) when a mesh vertex does not belong to any envelope range of any bone in accordance with the former three rules, the weight of the mesh vertex in relation to a bone closest to the mesh vertex is 1.0, which indicates that the mesh vertex is totally affected by the movement of the bone closest to the mesh vertex; and rule (5) each value of the weight of the mesh vertices on the weight table has to be normalized so that the sum of all the values is 1.0. Through the above rules, the mesh vertices weight calculating unit 116 can establish a weight table to record all the weights of the mesh vertices affected by all the bones.

After the procedures described above, the avatar of the present disclosure comprises not only the skin information (data of mesh vertices), the skeleton information (identification data and geometric data of each bone of the set of the skeletons, and linkage relationship data and movable degrees of freedom between each bone of the set of the skeletons), but also the relationship information between the skin and the set of skeletons (i.e., envelope range of the set of skeletons, and the weights of the mesh vertices, which indicate how the mesh vertices affected by the set of skeletons). The output unit 117 of the avatar generation module 110 is used to output the avatar to the display unit 130 for displaying the avatar, and output the avatar to the arithmetic unit 124 for further manipulation of the avatar.

In addition to the avatar generation module 110, the present disclosure further comprises an avatar manipulation module 120. As shown in FIG. 1, the avatar manipulation module 120 of the present disclosure further comprises a position mark 121, at least one control mark 122, at least one video capturing unit 123 and an arithmetic unit 124.

Figure 7:
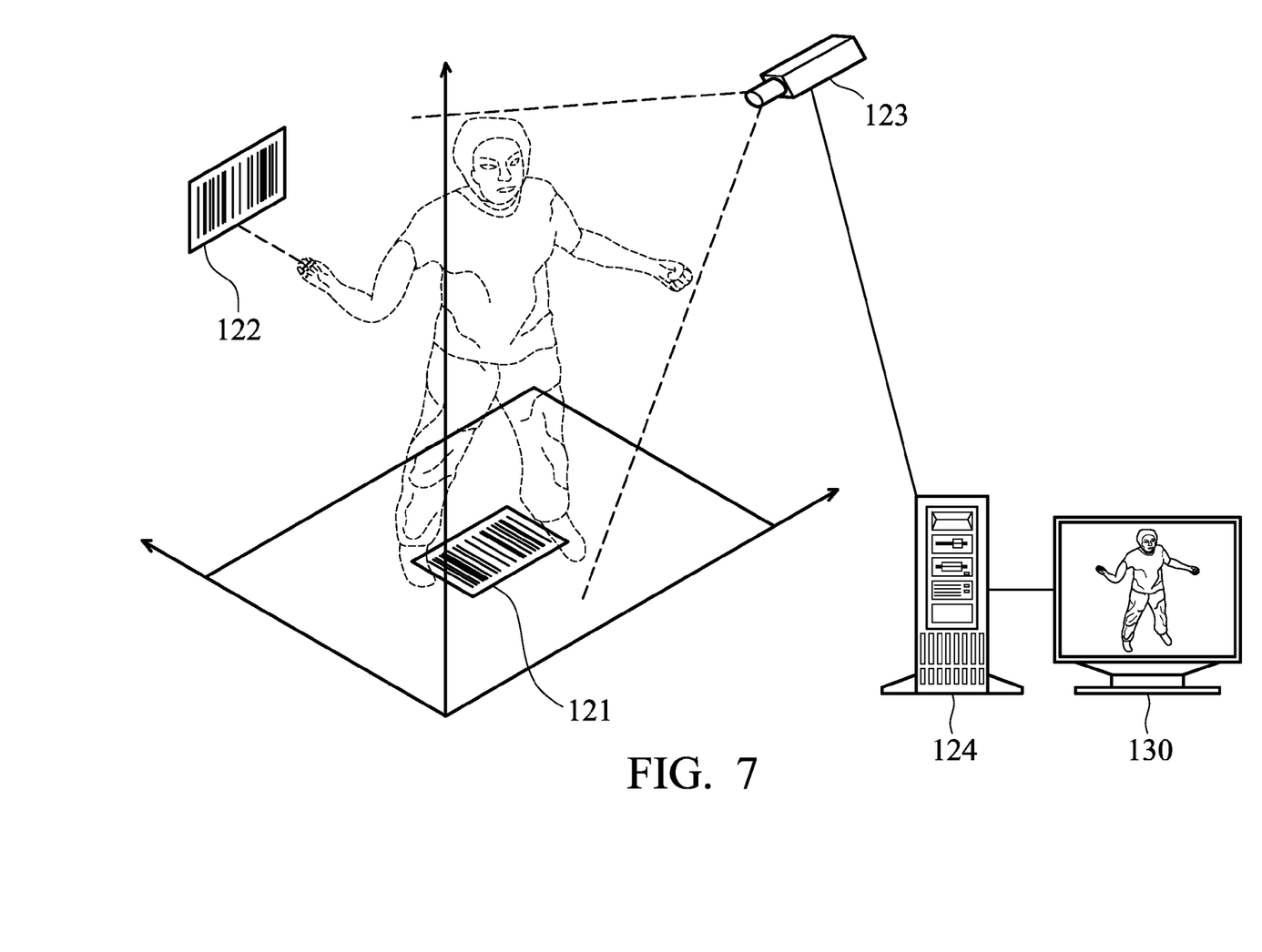
FIG. 7 is a diagram illustrating an embodiment of the present disclosure which employs the avatar manipulation module to manipulate an avatar.

FIG. 7 is a diagram illustrating an embodiment of the present disclosure which employs the avatar manipulation module to manipulate an avatar. The avatar manipulation module in FIG. 7 comprises a position mark 121, at least one control mark 122, a video capturing unit 123 and an arithmetic unit 124. The manipulated avatar is shown on the display unit 130. The position mark 121 and the control mark 122 are the objects having identifiable shapes, sizes or colors, or parts of a human body (note that one can use their two fingers as the position mark 121 and the control mark 122). The position mark 121 and the control mark 122 can be moved by users (by hands, manually or machines, automatically) in a real space. For example, the position mark 121 is moved by users to a first real position, $(x_0, y_0, z_0)$, while the control mark 122 is moved by users to a second real position, $(x_1, y_1, z_1)$.

The video capturing unit 123, e.g. camcorders, is used to shoot the real space to obtain the images of the real space and the position mark 121 and the control mark 122 in the real space. There may be only one camcorder in an embodiment. In order to achieve a stereoscopy effect or multi-view effect, two or more than two camcorders may be employed in other embodiments, which will be described further later.

The arithmetic unit 124 of the present disclosure is coupled to the video capturing unit 123, and is used to identify the first real position of the position mark 121 and the second real position of the control mark 122 from the images captured by the video capturing unit 123. However, the location and direction of the video capturing unit 123 may be fixed or changeable from time to time. In an embodiment, the position mark 121 and the control mark 122 are barcodes or other objects which visible appearances have identifiable shapes, sizes or colors, in order to make it easier for the video capturing unit 123 to identify them. By checking the shape and size of the two barcodes, the arithmetic unit 124 may easily determine the relative distance and direction between the two marks 121 and 122 and the camcorders (video capturing unit 123). Open source software, such as ARToolkit and ARtag, may work in coordination with the arithmetic unit 124 to identify the marks and calculate the spatial coordinates of the marks. Further, the arithmetic unit 124 may further covert the first real position of the position mark 121 in the real space into a first virtual position where the avatar is in the virtual space, and the second real position of the control mark 122 in the real space to a second virtual position where a movable node of the avatar is in the virtual space. It is appreciated that relative motions between the virtual control position and the first virtual position make the avatar perform a series of successive motions in the virtual space. In an embodiment, if a user wants to control the location of the whole avatar in the virtual space, the position mark 121 may be moved. Also, if a user wants to control the forearm of the avatar by the control mark 122, a point on the forearm bone of the avatar as a movable node (which is controlled by the control mark 122) may be set, before moving the control mark 122. Due to the linkage relationship between the forearm skin and the forearm bone, the whole forearm (including the forearm skin) will move when the control mark 121 is moving in the real space. Note that, due to the function performed by the avatar generation module 110 (especially the mesh vertices weight calculating unit 116), when the forearm of the avatar is moving, the skin away from the forearm, for example, the skin of chest or shoulder, will be moving accordingly. Thus, the avatar generated by the present disclosure has more smooth and natural movements.

Figure 3:
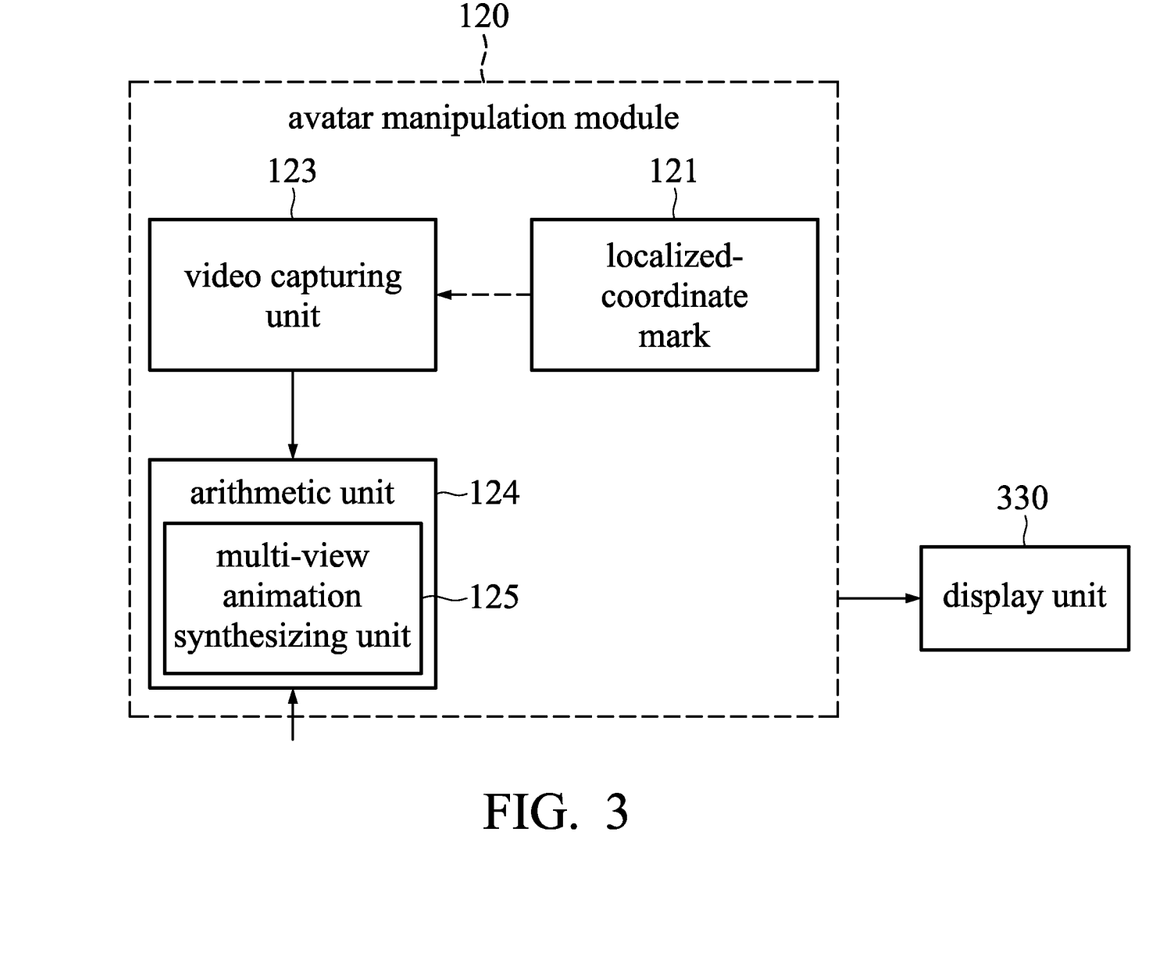
FIG. 3 is a diagram illustrating a multi-view display technology of the present disclosure.

The display unit 130 of the present disclosure is coupled to the avatar generation module 110 and the avatar manipulation module 120, and is used to display the avatar and the virtual space where the avatar exists. FIG. 3 is a diagram illustrating a multi-view display technology of the present disclosure. In an embodiment, the display unit 330 is a multi-view display unit, a stereo display, or a naked eye multi-view displayer. With the video capturing unit 123 having a plurality of camcorders and a multi-view animation synthesizing unit 125, the present disclosure may achieve stereoscopy effect or multi-views effect. For example, if the video capturing unit 123 has two camcorders, each may respectively represent a right and left eye of a human. The multi-view animation synthesizing unit may generate stereo videos by using an interlaced signal synthesizing method or a collateral signal synthesizing method. In an embodiment, the interlaced signal synthesizing method obtains the odd columns of an image of a left sight signal from a left camcorder and even columns of an image of a right sight signal from a right camcorder, and then combines the odd and even columns together to generate an interlaced image. In another embodiment, the interlaced signal synthesizing method obtains even columns of an image of a left sight signal from a left camcorder and odd columns of an image of a tight sight signal from a right camcorder, and then combines the odd and even columns together to generate an interlaced image. The collateral signal synthesizing can draw the right and left sight signal in a same image collaterally. By using the multi-view animation synthesizing unit, the display unit 130 employing a stereo display or a naked eye multi-view display may show pictures with depth perception to viewers.

The animation generation system 100 of the present disclosure has been discussed above. It is noted that, for the purpose of illustrating the present disclosure, the avatar generation module 110, the avatar manipulation module 120, the display unit 130, the readout unit 111, the analyzing unit 112, the rough fitting unit 113, the precise fitting unit 114, the envelope range calculating unit 115, the mesh vertices weight calculating unit 116, the output unit 117, the model establishing unit 118 in the avatar generation module 110, and the video capturing unit 123 and the arithmetic unit 124 in the avatar manipulation module 120 are described separately. Any combination of above the parts may be integrated in and performed by a single computer, or separated on the network and performed by a plurality of computers.

Figure 8A:
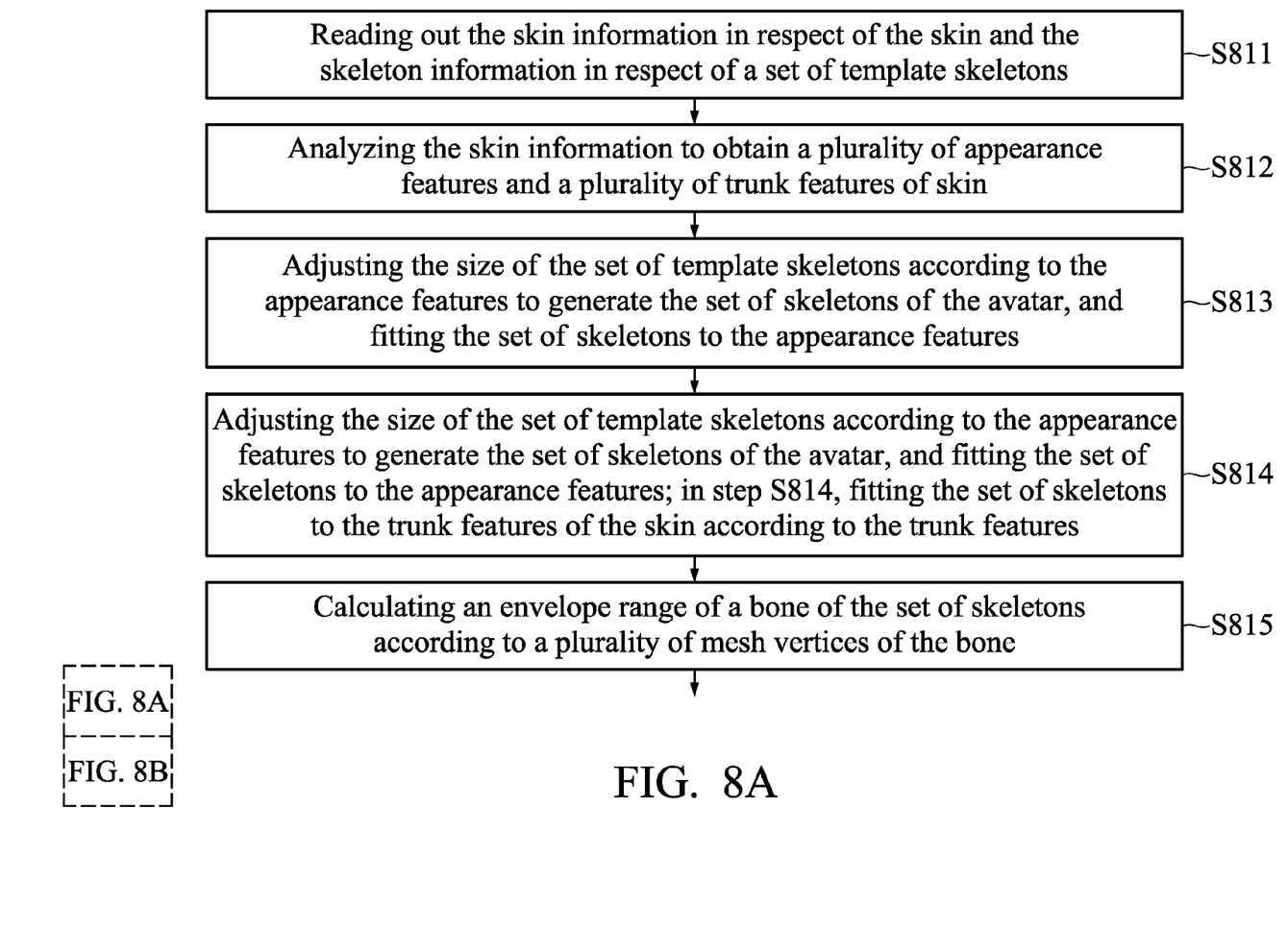
FIGS. 8A and 8B is a flowchart of the animation generation method according to one embodiment of the present disclosure.
Figure 8B:
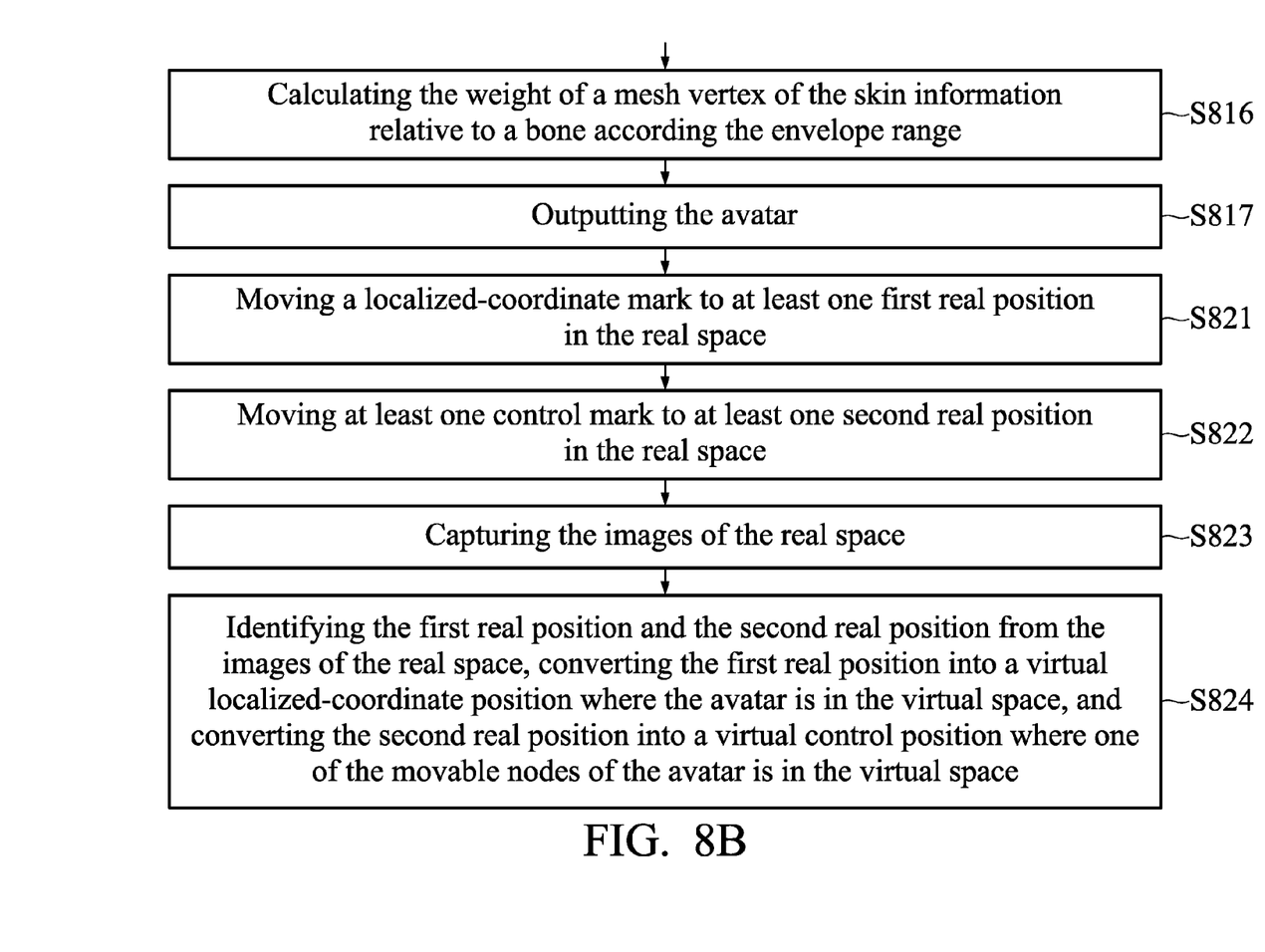

The present disclosure also provides an animation generation method. FIGS. 8A and 8B is a flowchart of the animation generation method according to one embodiment of the present disclosure. The animation generation method of the present disclosure is used to generate an avatar in a virtual space, the avatar has a set of skeletons, and a skin attached to the set of skeletons, where the set of skeletons has a plurality of movable nodes. The animation generation method is used to manipulate the movable nodes of the avatar. Each of the steps of the animation generation method may be respectively performed by the components of the animation generation system 100 described above. The animation generation method comprises: in step S811, reading out the skin information in respect of the skin, skeleton information in respect of a set of template skeletons, wherein the skin information is composed of data of a plurality of mesh vertices, and the skeleton information comprises geometric data of each bone of the set of template skeletons and the linkage relationship between the bones of the set of template skeletons; in step S812, analyzing the skin information to obtain a plurality of appearance features and a plurality of trunk features of skin, where the appearance features are protruding points of skin, and the trunk features form a central axis within the skin; in step S813, adjusting the size of the set of template skeletons according to the appearance features to generate the set of skeletons of the avatar, and fitting the set of skeletons to the appearance features; in step S814, fitting the set of skeletons to the trunk features of the skin; in step S815, calculating an envelope range of a bone of the set of skeletons according to a plurality of mesh vertices of the bone; in step S816, calculating the weight of a mesh vertex of the skin information relative to a bone according the envelope range, wherein the weight of the mesh vertex indicates how the mesh vertex is affected by the movement of the bone when the bone is moving; in step S817, outputting the avatar to the arithmetic unit 124 and/or display unit 130 in FIG. 1, wherein the outputted avatar comprises data in relation to the skin, the set of skeletons and the relationships therebetween. After steps S811~S817, a manipulatable avatar is produced. Then, the present disclosure further manipulates the avatar. In step S821, moving a position mark to at least one first real position in the real space; in step S822, moving at least one control mark to at least one second real position in the real space; in step S823, capturing the images of the real space; and in step S824, identifying the first real position and the second real position from the images of the real space, converting the first real position into a first virtual position where the avatar is in the virtual space, and converting the second real position into a second virtual position where one of the movable nodes of the avatar is in the virtual space, wherein the relative motions between the second virtual position and the first virtual position make the avatar perform a series of successive motions in the virtual space. In an embodiment, the animation generation method also comprises: obtaining image data from a real model, constructing a virtual model in accordance with the image data, and providing the skin information to the other elements. The method for constructing the virtual model comprises employing a visual hull algorithm. In an embodiment, the present disclosure may fit the set of skeletons to the appearance features and the trunk features by using Inverse Kinematics. In an embodiment, the envelope range provided in step S815 is two-layer-barrel shaped, and each of the two ends of the envelope range has two concentric hemispheres where the outer half is removed. The shape of and the method for constructing the envelope range has been illustrated in the preceding examples with reference to FIG. 4. Further, the rules for calculating the weight of the mesh vertices in step S816 has been illustrated in the proceeding example in reference to the mesh vertices weight calculating unit 116. The animation generation method of the present disclosure also comprises displaying the virtual space and the avatar in a step (not shown in the FIGS). This step may further synthesize a plurality of visual signals obtained by the camcorders by employing multi-view animation synthesizing technology. The multi-view animation technology may be an interlaced signal synthesizing method or a collateral signal synthesizing method, as illustrated above. In an embodiment, the animation generation method of the present disclosure may follow the order shown in FIGS. 8A and 8B. However, the present disclosure is not limited to the particular order. For example, steps S821~S824 may be performed at the same time.

While the disclosure has been described by way of example and in terms of the exemplary embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An animation generation system, comprising:
    an avatar generation module for generating an avatar in a virtual space, wherein the avatar has a set of skeletons and a skin attached to the set of skeletons, and the set of skeletons has a plurality of movable nodes, and the movable nodes are manipulated so that a motion of the skin is induced; and
    an avatar manipulation module for manipulating the movable nodes of the avatar, comprising:
        a position mark which is moved by users to at least one first real position in a real space;
        at least one control mark which is moved by the users to at least one second real position in the real space;
        a video capturing unit for capturing the images of the real space;
        an arithmetic unit, coupled to the video capturing unit, for identifying the first real position and the second real position from the images of the real space, and converting the first real position into a first virtual position where the avatar is in the virtual space, and the second real position into a second virtual position where one of the movable nodes of the avatar is in the virtual space, wherein the relative motions between the second virtual position and the first virtual position make the avatar perform a series of successive motions in the virtual space, and
        one of the images captured by the video capturing unit are drawn as a background, while one of the images of a designated object corresponding to the position mark is drawn onto the background, according to the first virtual position, to generate an Augmented Reality (AR) animation,
    wherein the avatar generation module further comprises:
        a readout unit for reading out skin information in respect of the skin, and skeleton information in respect of a set of template skeletons, wherein the skin information is composed of data of a plurality of mesh vertices, and the skeleton information comprises geometric data of each bone of the set of template skeletons and the linkage relationship between the bones of the set of template skeletons;
        an analyzing unit for analyzing the skin information to obtain a plurality of appearance features and a plurality of trunk features of the skin;
        a rough fitting unit for adjusting the size of the set of template skeletons according to the appearance features to generate the set of skeletons of the avatar, and fitting the set of skeletons to the appearance features;
        a precise fitting unit for fitting the set of skeletons to the trunk features of the skin;
        an envelope range calculating unit for calculating an envelope range of a bone of the set of skeletons according to a plurality of mesh vertices in proximity to the bone;
        a mesh vertices weight calculating unit for calculating the weight of a mesh vertex of the skin information relative to a bone according the envelope range, wherein the weight of the mesh vertex indicates how the mesh vertex is affected by the movement of the bone when the bone is moving; and
        an output unit for outputting the avatar to the arithmetic unit, wherein the outputted avatar comprises data in relation to the skin, the set of skeletons and the relationships therebetween.

2. The animation generation system as claimed in claim 1, wherein the position mark and the control mark are barcodes or other objects which visible appearances have identifiable shapes, patterns, dimensions or colors.

3. The animation generation system as claimed in claim 1, wherein the video capturing unit is composed of at least one camcorder.

4. The animation generation system as claimed in claim 1, wherein the AR animation drawn by the arithmetic unit is stored into a storage unit.

5. The animation generation system as claimed in claim 1, wherein the designated object is a successive motion.

6. The animation generation system as claimed in claim 1, wherein the designated object is a virtual three dimension (3D) model.

7. The animation generation system as claimed in claim 1, wherein the envelope range is two-layer-barrel-shaped, and each of the two ends of the envelope range is a concentric hemisphere.

8. The animation generation system as claimed in claim 1, wherein rules for the mesh vertices weight calculating unit to calculate the mesh vertices weight comprises:
   rule (1): when a mesh vertex is inside the inner layer of the envelope of a bone, the weight of the mesh vertex in relation to the bone is 1.0, which indicates that the mesh vertex is totally affected by the movement of the bone when the bone is moving;
   rule (2): when a mesh vertex is outside of the outer layer of the envelope of a bone, the weight of the mesh vertex in relation to the bone is 0.0, which indicates that the mesh vertex is totally unaffected by the movement of the bone when the bone is moving;
   rule (3) when a mesh vertex is between the inner and outer layer of the envelope range of a bone, the weight of the mesh vertex in relation to the bone decreases from 1.0 to 0.0, which indicates that the mesh vertex is partially affected by the movement of the bone according to the distance between the mesh vertex and the bone;
   rule (4) when a mesh vertex does not belong to any envelope range of any bone in accordance with the former three rules, the weight of the mesh vertex in relation to a bone closest to the mesh vertex is 1.0, which indicates that the mesh vertex is totally affected by the movement of the bone closest to the mesh vertex; and
   rule (5) when all the weights of the mesh vertices affected by all the bones are recorded to form a weight table, each value of the weight of the mesh vertices on the weight table has to be normalized so that the sum of all the values is 1.0.

9. The animation generation system as claimed in claim 1 further comprising:
   a display unit, coupled to the arithmetic unit, for displaying the virtual space and the avatar.

10. The animation generation system as claimed in claim 4, wherein the AR animation is a 2D image stream, or a multi-view image stream.

11. The animation generation system as claimed in claim 10, wherein the synthesizing method of the multi-view image stream is an interlaced signal synthesizing method or a collateral signal synthesizing method.

12. An animation generation method for generating an avatar in a virtual space, wherein the avatar has a set of skeletons and a skin attached to the set of skeletons, and the set of skeletons has a plurality of movable nodes, and the movable nodes are manipulated so that a motion of the skin is induced; comprising:
   moving a position mark to at least one first real position in a real space;
   moving at least one control mark to at least one second real position in the real space;
   capturing the images of the real space;
   identifying the first real position and the second real position from the images of the real space;
   converting the first real position into a first virtual position where the avatar is in the virtual space;
   converting the second real position into a second virtual position where one of the movable nodes of the avatar is in the virtual space, wherein the relative motions between the virtual control position and the first virtual position make the avatar perform a series of successive motions in the virtual space,
   drawing the one of images of the real space as a background, and drawing a designated object on the first virtual position onto the background to generate an Augmented Reality (AR) animation,
   reading out skin information in respect of the skin, and skeleton information in respect of a set of template skeletons, wherein the skin information is composed of data of a plurality of mesh vertices, and the skeleton information comprises geometric data of each bone of the set of template skeletons and the linkage relationship between the bones of the set of template skeletons;
   analyzing the skin information to obtain a plurality of appearance features and a plurality of trunk features of the skin;
   adjusting the size of the set of template skeletons according to the appearance features to generate the set of skeletons of the avatar, and fitting the set of skeletons to the appearance features;
   fitting the set of skeletons to the trunk features of the skin;
   calculating an envelope range of a bone of the set of skeletons according to a plurality of mesh vertices in proximity to the bone;
   calculating the weight of a mesh vertex of the skin information relative to a bone according the envelope range, wherein the weight of the mesh vertex indicates how the mesh vertex is affected by the movement of the bone when the bone is moving; and
   outputting the avatar to the arithmetic unit, wherein the outputted avatar comprises data in relation to the skin, the set of skeletons and the relationships therebetween.

13. The animation generation method as claimed in claim 12, wherein the designated object is a successive motion.

14. The animation generation method as claimed in claim 12, wherein the designated object is a virtual three dimension (3D) model.

15. The animation generation method as claimed in claim 12, wherein the AR animation is a 2D image stream, or a multi-view image stream.

16. The animation generation method as claimed in claim 12, wherein the envelope range is two-layer-barrel-shaped, and each of the two ends of the envelope range is a concentric hemisphere.

17. The animation generation method as claimed in claim 12, wherein rules for the mesh vertices weight calculating unit to calculate the mesh vertices weight comprises:
   rule (1): when a mesh vertex is inside the inner layer of the envelope of a bone, the weight of the mesh vertex in relation to the bone is 1.0, which indicates that the mesh vertex is totally affected by the movement of the bone when the bone is moving;
   rule (2): when a mesh vertex is outside of the outer layer of the envelope of a bone, the weight of the mesh vertex in relation to the bone is 0.0, which indicates that the mesh vertex is totally unaffected by the movement of the bone when the bone is moving;
   rule (3) when a mesh vertex is between the inner and outer layer of the envelope range of a bone, the weight of the mesh vertex in relation to the bone decreases from 1.0 to 0.0, which indicates that the mesh vertex is partially affected by the movement of the bone according to the distance between the mesh vertex and the bone;
   rule (4) when a mesh vertex does not belong to any envelope range of any bone in accordance with the former three rules, the weight of the mesh vertex in relation to a bone closest to the mesh vertex is 1.0, which indicates that the mesh vertex is totally affected by the movement of the bone closest to the mesh vertex;

rule (5) when all the weights of the mesh vertices affected by all the set of skeletons are recorded to form a weight table, each value of the weight of the mesh vertices on the weight table has to be normalized so that the sum of all the values is 1.0.

18. A multi-view animation generation system, comprising:

at least one mark which is moved by users to at least one first real position in a real space;

an arithmetic unit, coupled to at least two video capturing units, wherein the at least two video capturing units capturing image streams of the real space and transmitting the image stream to the arithmetic unit, and the arithmetic unit identifying at least two first real positions from the images of the real space, and converting the at least two real positions into at least two virtual positions in virtual space;

a multi-view animation synthesizing unit, coupled to the arithmetic unit, for drawing one of the images captured by the video capturing unit as a background;

drawing a virtual model corresponding to the mark on one of the at least two virtual positions onto the background;

synthesizing the background and the virtual model to generate an animation; and transmitting the animation to the multi-view display unit, an avatar generation module, comprising:

a readout unit for reading out skin information in respect of a skin of an avatar, and skeleton information in respect of a set of template skeletons of the avatar, wherein the skin information is composed of data of a plurality of mesh vertices, and the skeleton information comprises geometric data of each bone of the set of template skeletons and the linkage relationship between bones of the set of template skeletons;

an analyzing unit for analyzing the skin information to obtain a plurality of appearance features and a plurality of trunk features of the skin;

a rough fitting unit for adjusting the size of the set of template skeletons according to the appearance features to generate the set of skeletons of the avatar, and fitting the set of skeletons to the appearance features;

a precise fitting unit for fitting the set of skeletons to the trunk features of the skin;

an envelope range calculating unit for calculating an envelope range of a bone of the set of skeletons according to a plurality of mesh vertices in proximity to the bone;

a mesh vertices weight calculating unit for calculating the weight of a mesh vertex of the skin information relative to a bone according the envelope range, wherein the weight of the mesh vertex indicates how the mesh vertex is affected by the movement of the bone when the bone is moving;

an output unit for outputting the avatar to the arithmetic unit, wherein the outputted avatar comprises data in relation to the skin, the set of skeletons and the relationships therebetween.

19. A multi-view video generation method for synthesizing a multi-view video and drawing a virtual model in the multi-view video, comprising:

placing a mark on at least one real position in a real space;

capturing the images of the real space by using at least two video capturing units;

identifying at least two real positions from the images of the real space;

converting the at least two real positions into at least two virtual positions in a virtual space; and synthesizing a multi-view video, comprising:

drawing one of the images captured by the video capturing unit as a background;

drawing a virtual model corresponding to the mark on one of the at least two virtual positions onto the background to form a result video; and synthesizing the background and the virtual model by using known multi-view synthesizing methods to generate a multi-view video, and reading out skin information in respect of a skin of an avatar, and skeleton information in respect of a set of template skeletons of the avatar, wherein the skin information is composed of data of a plurality of mesh vertices, and the skeleton information comprises geometric data of each bone of the set of template skeletons and the linkage relationship between the bones of the set of template skeletons;

analyzing the skin information to obtain a plurality of appearance features and a plurality of trunk features of the skin;

adjusting the size of the set of template skeletons according to the appearance features to generate the set of skeletons of the avatar, and fitting the set of skeletons to the appearance features;

fitting the set of skeletons to the trunk features of the skin;

calculating an envelope range of a bone of the set of skeletons according to a plurality of mesh vertices in proximity to the bone;

calculating the weight of a mesh vertex of the skin information relative to a bone according the envelope range, wherein the weight of the mesh vertex indicates how the mesh vertex is affected by the movement of the bone when the bone is moving; and outputting the avatar to the arithmetic unit, wherein the outputted avatar comprises data in relation to the skin, the set of skeletons and the relationships therebetween.

* * * * *